(12) United States Patent
Yang et al.

(10) Patent No.: US 9,517,541 B2
(45) Date of Patent: Dec. 13, 2016

(54) BRAKING MECHANISM AND PROCESSING DEVICE USING THE SAME

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jun Fu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/716,414

(22) Filed: May 19, 2015

(65) Prior Publication Data
US 2016/0114445 A1    Apr. 28, 2016

(30) Foreign Application Priority Data

Oct. 28, 2014   (CN) .......................... 2014 1 0585770

(51) Int. Cl.
*B23Q 11/00*   (2006.01)
*B23Q 5/52*    (2006.01)
(Continued)

(52) U.S. Cl.
CPC .............. *B23Q 5/52* (2013.01); *B23Q 11/0092* (2013.01); *F16D 59/02* (2013.01); *F16D 63/008* (2013.01); *F16D 2125/66* (2013.01)

(58) Field of Classification Search
CPC ............... B23Q 5/20; B23Q 5/56; B23Q 5/00; B23Q 5/52; B23Q 11/00; B23Q 11/0092; F16D 63/002; F16D 63/008
See application file for complete search history.

(56) References Cited

U.S. PATENT DOCUMENTS 3,628,451 A * 12/1971 McClellan ............. B21D 51/26
                                                                  101/32
4,019,246 A *  4/1977 Tomita .................. B23B 31/263
                                                                  483/35

(Continued)

FOREIGN PATENT DOCUMENTS

CN          103836068 A     6/2014
DE     202011107776 U1   1/2012
(Continued)

*Primary Examiner* — Will Fridie, Jr.
(74) *Attorney, Agent, or Firm* — Zhigang Ma

(57) ABSTRACT

A braking mechanism includes a rack, a receiving member, a braking member, a base seat, a resetting member and an elastic member. Two ends of the resetting member abut the base seat and the receiving member, and the elastic member is positioned between the base seat and the braking member. The elastic member and the resetting member are positioned at opposite sides of the braking member. The base seat includes a first guiding portion, the braking member includes a second guiding portion and an engaging part. The second guiding portion is capable of moving along the first guiding portion under an elastic restorative force of the resetting member and the elastic member, such that the engaging part is engaged with the rack.

20 Claims, 13 Drawing Sheets

(51) Int. Cl.
*F16D 59/02* (2006.01)
*F16D 63/00* (2006.01)
B23Q 5/00 (2006.01)
*F16D 125/66* (2012.01)

(56) References Cited

U.S. PATENT DOCUMENTS

| | | | | | |
|---|---|---|---|---|---|
| 4,501,999 | A | * | 2/1985 | Kohzai | B23Q 5/20 318/572 |
| 4,819,311 | A | * | 4/1989 | Hashimoto | B23B 31/263 29/40 |
| 5,090,278 | A | * | 2/1992 | Mair | B23Q 5/56 409/240 |
| 2006/0180017 | A1 | * | 8/2006 | Williams | F16C 29/00 92/88 |
| 2009/0025494 | A1 | * | 1/2009 | Giusto | B23Q 1/58 74/25 |
| 2013/0092484 | A1 | * | 4/2013 | Chen | F16D 63/008 188/170 |
| 2013/0284551 | A1 | * | 10/2013 | Nadig | B23Q 11/0092 188/267 |
| 2015/0128774 | A1 | * | 5/2015 | Wu | B23B 5/36 82/18 |
| 2016/0114445 | A1 | * | 4/2016 | Yang | F16D 59/02 82/137 |

FOREIGN PATENT DOCUMENTS

| | | |
|---|---|---|
| DE | 102011101804 A1 | 11/2012 |
| DE | 102012025438 A1 | 6/2014 |

\* cited by examiner

BRAKING MECHANISM AND PROCESSING DEVICE USING THE SAME

FIELD

The subject matter herein generally relates to a braking mechanism and a processing device using the same.

BACKGROUND

In processing a workpiece, a cutter is used to process the workpiece driven by a driving member. The cutter can be driven by a linear motor. However, if the linear motor loses power suddenly, the cutter would continue to move by inertia effect and scratch the workpiece.

BRIEF DESCRIPTION OF THE DRAWINGS

Implementations of the present technology will now be described, by way of example only, with reference to the attached figures.

DETAILED DESCRIPTION

Figure 1:
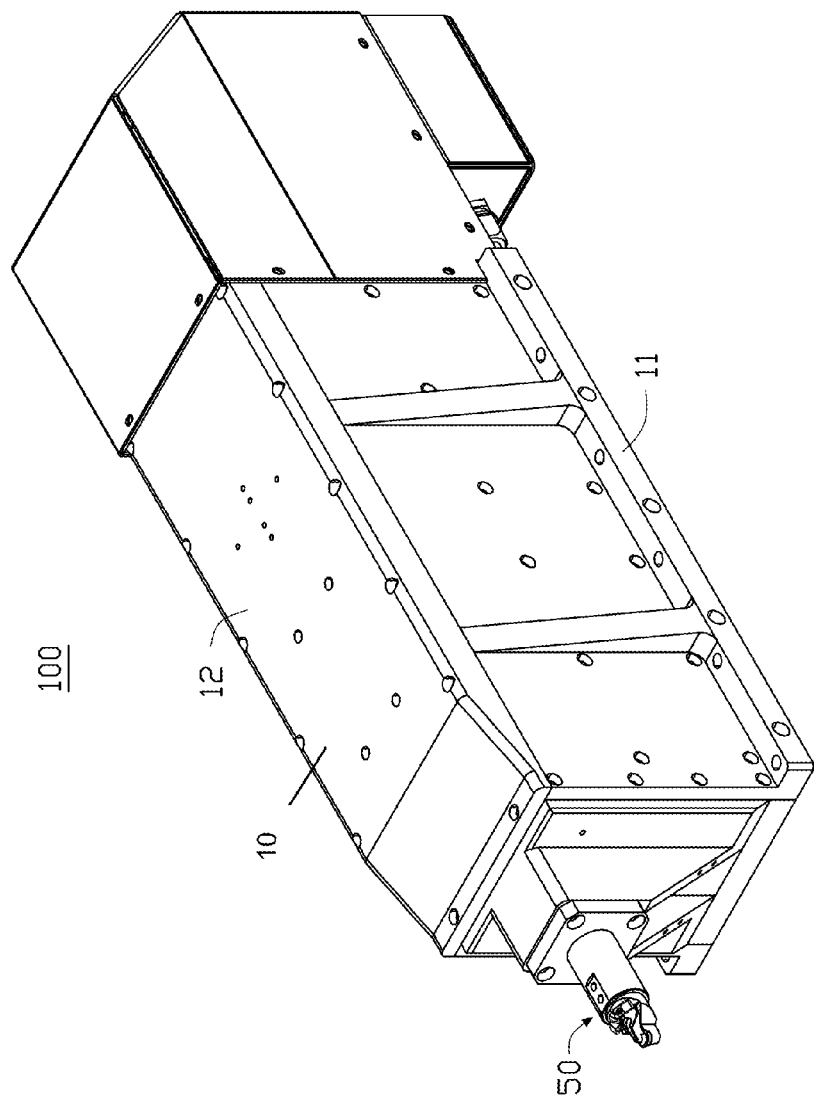
FIG. 1 is an isometric view of one embodiment of a processing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a braking mechanism and a processing device using the same.

FIG. 1 illustrates a processing device 100 including a fixing base 10 and a processing module 50. The fixing base 10 can include a first fixing plate 11 and a second fixing plate 12 facing each other. The processing module 50 can partially protrude out of the fixing base 10, and the processing module 50 can be configured to process workpieces (not shown).

Figure 2:
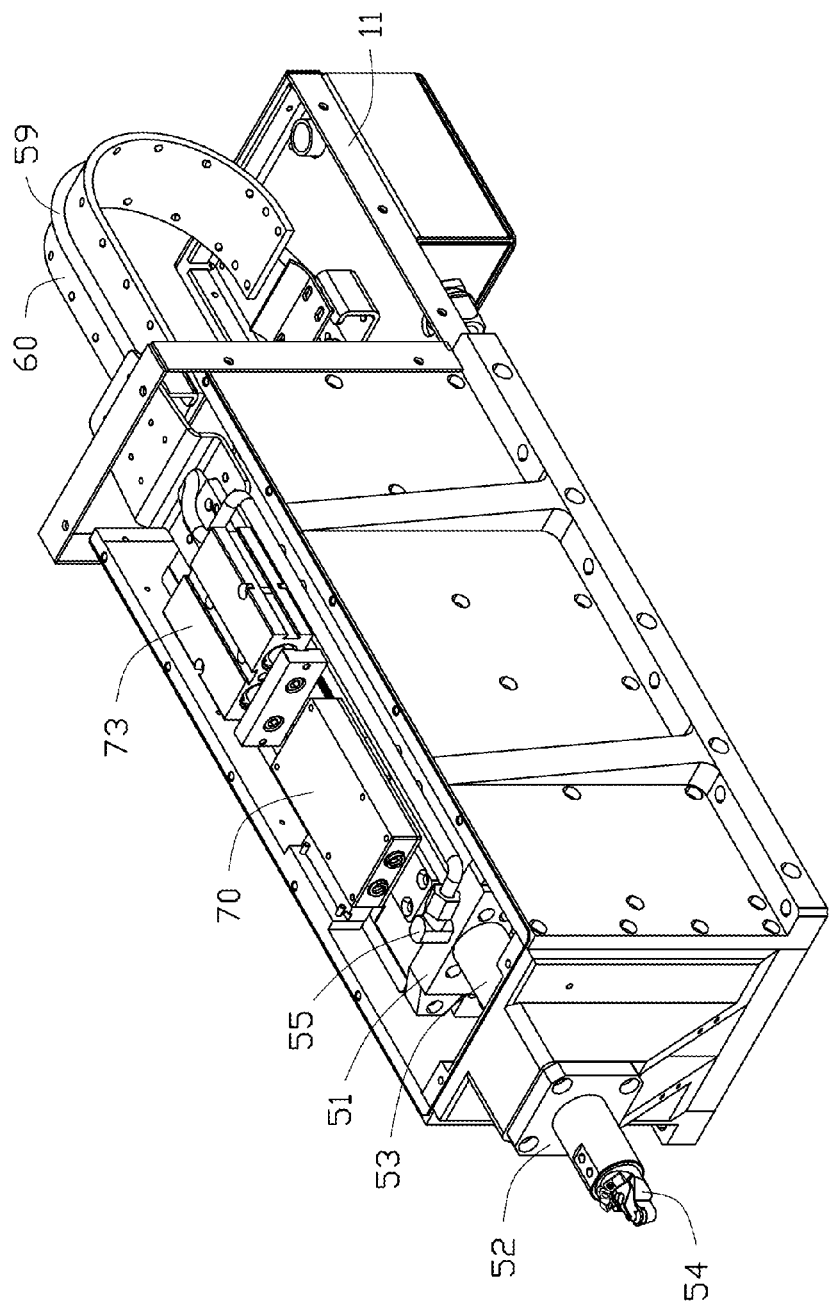
FIG. 2 is a partial, isometric view of the processing device shown in FIG. 1.
Figure 3:
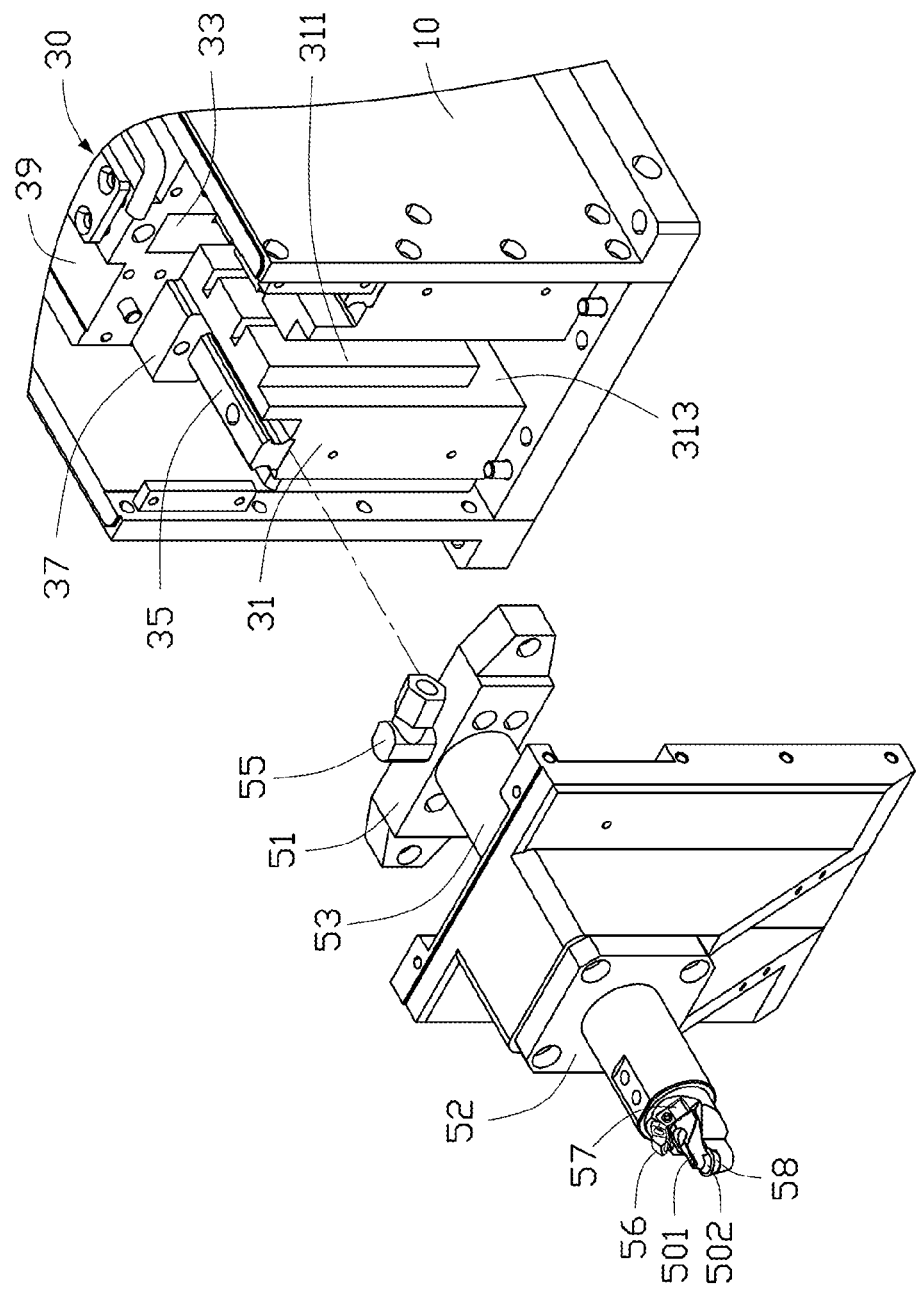
FIG. 3 is a partial, exploded view of the processing device shown in FIG. 1.
Figure 4:
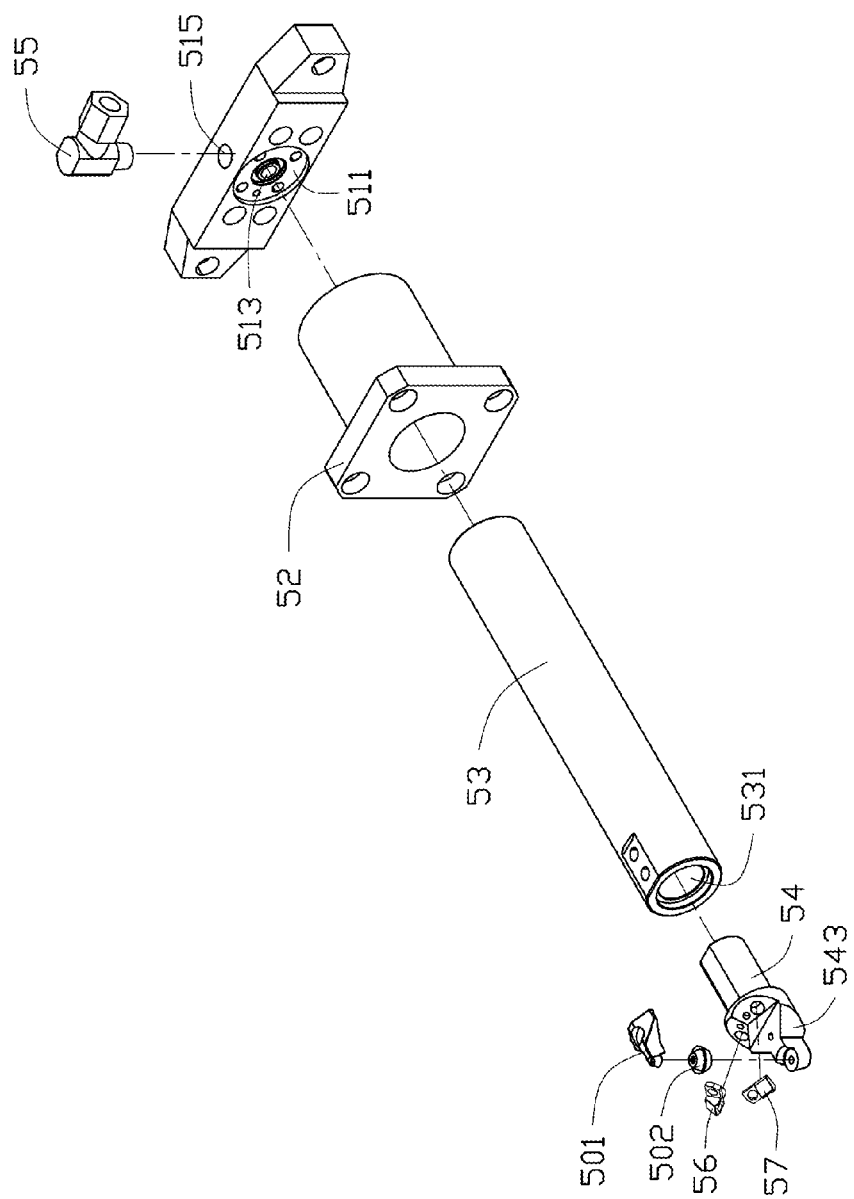
FIG. 4 is a partial, exploded view of a processing module of the processing device shown in FIG. 1.
Figure 5:
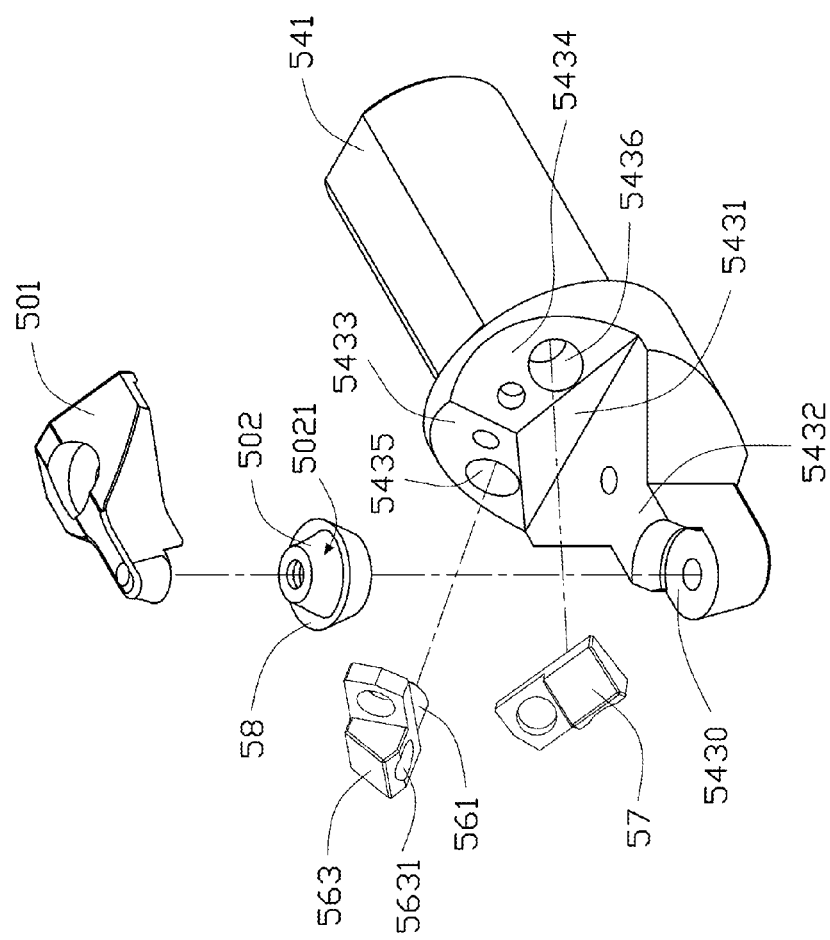
FIG. 5 is a partial, enlarged view of the processing module shown in FIG. 4.
Figure 6:
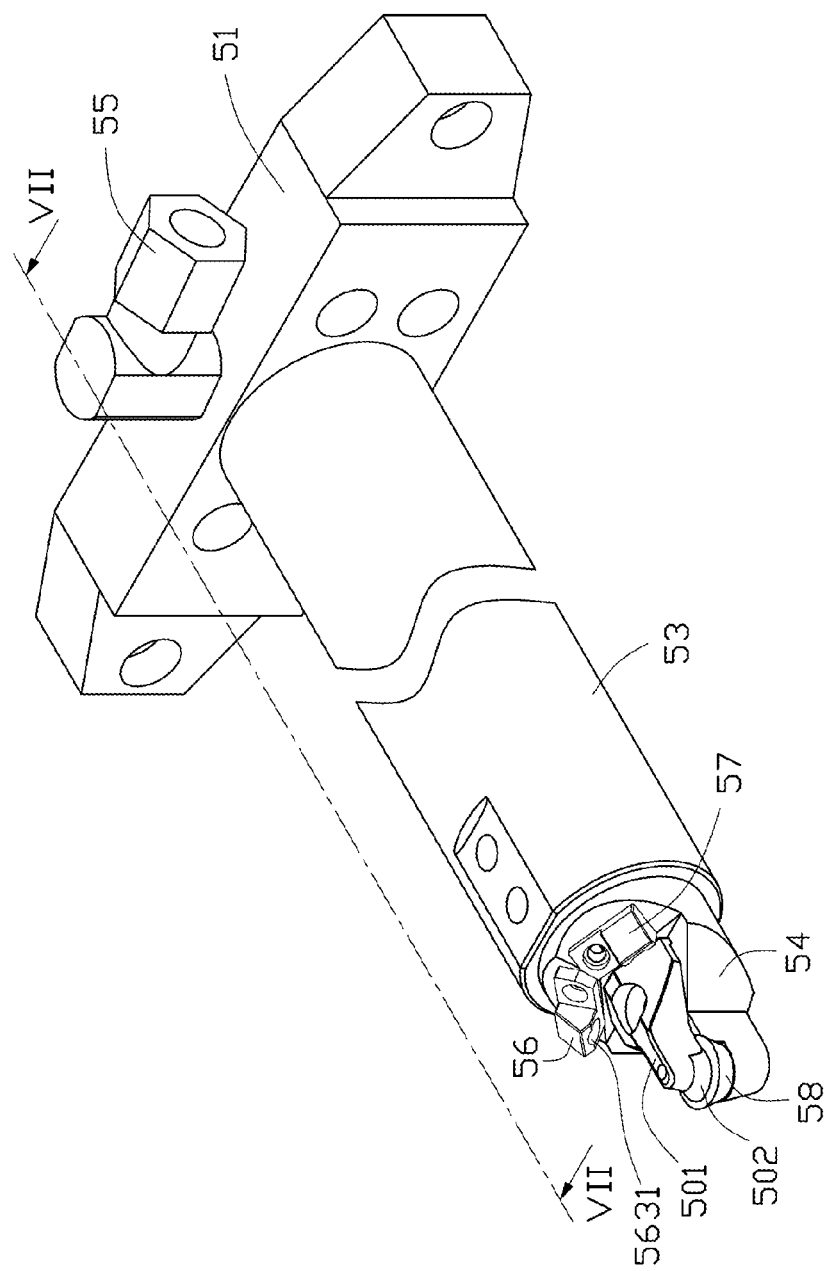
FIG. 6 is a partial, assembled view of the processing module shown in FIG. 4.
Figure 7:
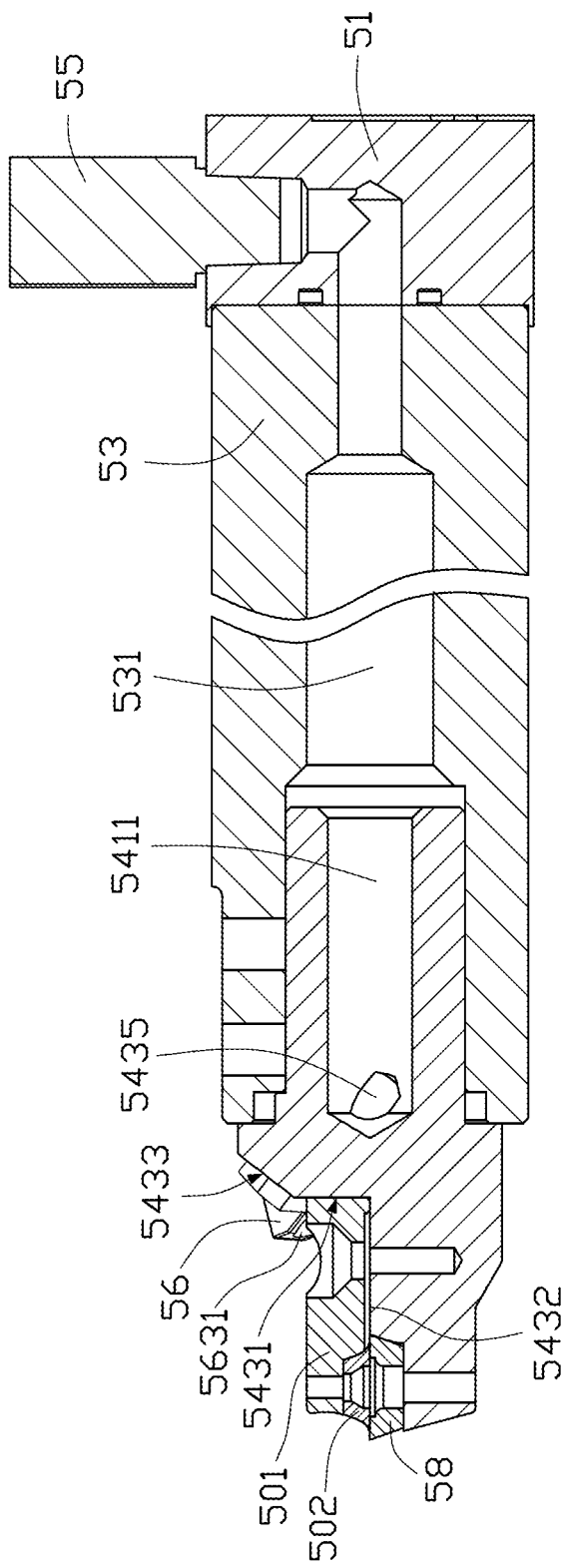
FIG. 7 is a cross sectional view taken along a line VII-VII of the processing module shown in FIG. 6.

FIG. 2 and FIG. 3 illustrate that the processing device 100 can further include a sliding module 30 and a braking mechanism 70 positioned in the fixing base 10. The processing module 50 can be coupled to the sliding module 30, thus the processing module 50 can move with the sliding module 30. The braking mechanism 70 can be coupled to the sliding module 30 to stop the moving of the sliding module 30. In at least one embodiment, the processing device 100 can be configured for turning. In other embodiments, the processing device 100 can be configured for polishing or cutting the workpiece.

The sliding module 30 can include two stators 31, a rotor 33, two sliding rails 35, two sliding members 37, and a mounting member 39. One end of each stator 31 can be vertically mounted to the first fixing plate 11, and the two stators 31 can be parallel to each other. The other end of each stator 31 can include a plurality of permanent magnets 311 distanced from each other. The permanent magnets 311 on the two stators 31 can cooperatively form a sliding path 313. One end of the rotor 33 can be positioned in the sliding path 313 in a sliding way, and the other end of the rotor 33 can protrude out of the sliding path 313. Each sliding rail 35 can be mounted at one side of the corresponding stator 31 away from the first fixing plate 11. The two sliding rails 35 can be parallel to each other. The sliding members 37 can be mounted on the sliding rails 35 in a sliding way. The mounting member 39 can be substantially plate-shaped. The mounting member 39 can be mounted on the stator 33, and two sides of the mounting member 39 can be fixed at the sides of the two sliding members 37 away from the corresponding sliding rails 35. The processing device 100 can further include a pipeline 59 and a support member 60. The pipeline 59 can extend through the first fixing plate 11 and the fixing base 10, and can be supported by the support member 60. The support member 59 can be substantially J-shaped, and one end of the support member 59 can be fixed at the mounting member 39.

FIG. 3 through FIG. 7 illustrate that the processing module 50 can include a fixing member 51, a connecting member 52, a transmission member 53, an assembling member 54, an liquid inlet joint 55, a first liquid outlet joint 56, a second liquid outlet joint 57, and a processing member 58. In other embodiments, the number of the liquid outlet joints can be more than two. The liquid inlet joint 55 can be connected to the pipeline 59 (shown in FIG. 2). The processing module 50 can be coupled to the mounting member 39.

The fixing member 51 can be substantially rectangular plate shaped and fixed at the mounting member 39. One surface of the fixing member 51 away from the mounting member 39 can define a first mounting recess 511. A bottom of the first mounting recess 511 can define a connecting hole 513 along the axis. The fixing member 51 can define a mounting hole 515 in communication with the connecting hole 513, and an axis of the connecting hole 513 can be perpendicular to the an axis of the mounting hole 515. A cross section of the connecting member 52 can be substantially hollow T-shaped. One end of the connecting member 52 can be fixed at the fixing base 10, and the other end of the connecting member 52 can be received in the fixing base 10. An axis of the connecting member 52 can overlap with an axis of the fixing member 51. The transmission member 53 can be substantially rod shaped. One end of the transmission member 53 can be received in the first mounting recess 511 and fixed at the fixing member 51. The other end of the transmission member 53 can movably pass through the connecting member 52 and extend to the outside of the fixing base 10. One end of the transmission member 53 adjacent to the first mounting recess 511 can define a through hole 531 along an axis line thereof.

The assembling member 54 can include a main body 541 and a fixing portion 543 coupled to the main body 541. The main body 541 can be received in the through hole 531, and the assembling member 54 can be fixed at the transmission member 53. The main body 541 can define a channel 5411 on the axis, and an axis of the channel 5411 can overlap with an axis of the through hole 531. The fixing portion 543 can include a connecting surface 5431, a mounting surface 5432, a first fixing surface 5433, and a second fixing surface 5434. The connecting surface 5431 can be perpendicular to the axis of the main body 541. The mounting surface 5432 can be parallel to the axis of the main body 541, and one end of the mounting surface 5432 away from the main body 541 can include a second mounting recess 5430. The connecting surface 5431 can connect to the first fixing surface 5433, the second fixing surface 5434, and the mounting surface 5432, and the connecting surface 5431 can be arranged between the mounting surface 5432 and the first mounting surface 5433. A plane angle of a dihedral angle formed by the first fixing surface 5433 and the connecting surface 5431 can be an obtuse angle, and the first fixing surface 5433 can extend away from the mounting surface 5432. A plane angle of a dihedral angle formed by the second fixing surface 5434 and the connecting surface 5431 can be an obtuse angle, and the second fixing surface 5434 can extend away from the mounting surface 5432. A plane angle of a dihedral angle formed by the first fixing surface 5433 and the second fixing surface 5434 can be an obtuse angle. The first fixing surface 5433 can define a first receiving hole 5435 in communication with the channel 5411. The second fixing surface 5434 can define a second receiving hole 5436 in communication with the channel 5411. The liquid inlet joint 55 can be fixed in the mounting hole 515 and communicated with the mounting hole 515. In other embodiments, the first fixing surface 5433 and the second fixing surface 5434 can extend toward the mounting surface 5432.

The first liquid outlet joint 56 can be fixed at the first fixing surface 5433, and the second liquid outlet joint 57 can be fixed at the second fixing surface 5434. In at least one embodiment, the first liquid outlet joint 56 can have a same structure with the second liquid outlet joint 57. The first liquid outlet joint 56 can include a main portion 561 and a protrusion portion 563 protruding out of the main portion 561. The main portion 561 can be cylindrical and define a through hole (not shown). The protrusion portion 563 can be substantially L-shaped. On end of the protrusion portion 563 can be fixed at the main portion 561, and the end of the protrusion portion 563 adjacent to the main portion 561 can define an opening 5631 in communication with the opening. The main portion 561 can be received in the first receiving hole 5435. An axis of the through hole of the first liquid outlet joint 56 can overlap with the first receiving hole 5435, and the opening 5631 can be in communication with the first receiving hole 5435. The opening 5631 can be defined toward the second mounting recess 5430.

The processing member 58 can be fixed at second the mounting portion 5430, and the first liquid outlet joint 56 and the second liquid outlet joint 57 can be arranged at two sides of the processing member 58, with the opening 5631 toward the processing member 58. In at least one embodiment, the processing member 58 can be a cutter.

The processing module 50 can further include a holding member 51 and a chip breaker 502. The holding member 501 can be mounted on the mounting surface 5432, and the chip breaker 502 can be mounted on one side of the holding member 51 toward the second mounting recess 5430. The chip breaker 502 can be positioned between the processing member 58 and the holding member 501, and supported by the processing member 58. The chip breaker 502 can be circular table shaped, and a diameter of one end of the chip breaker 502 adjacent to the processing member 58 can be smaller than a diameter of one end of the processing member adjacent to the chip breaker 502. The periphery of the chip breaker 502 can include a chip braking surface 5021 for braking scraps of the workpiece.

Figure 8:
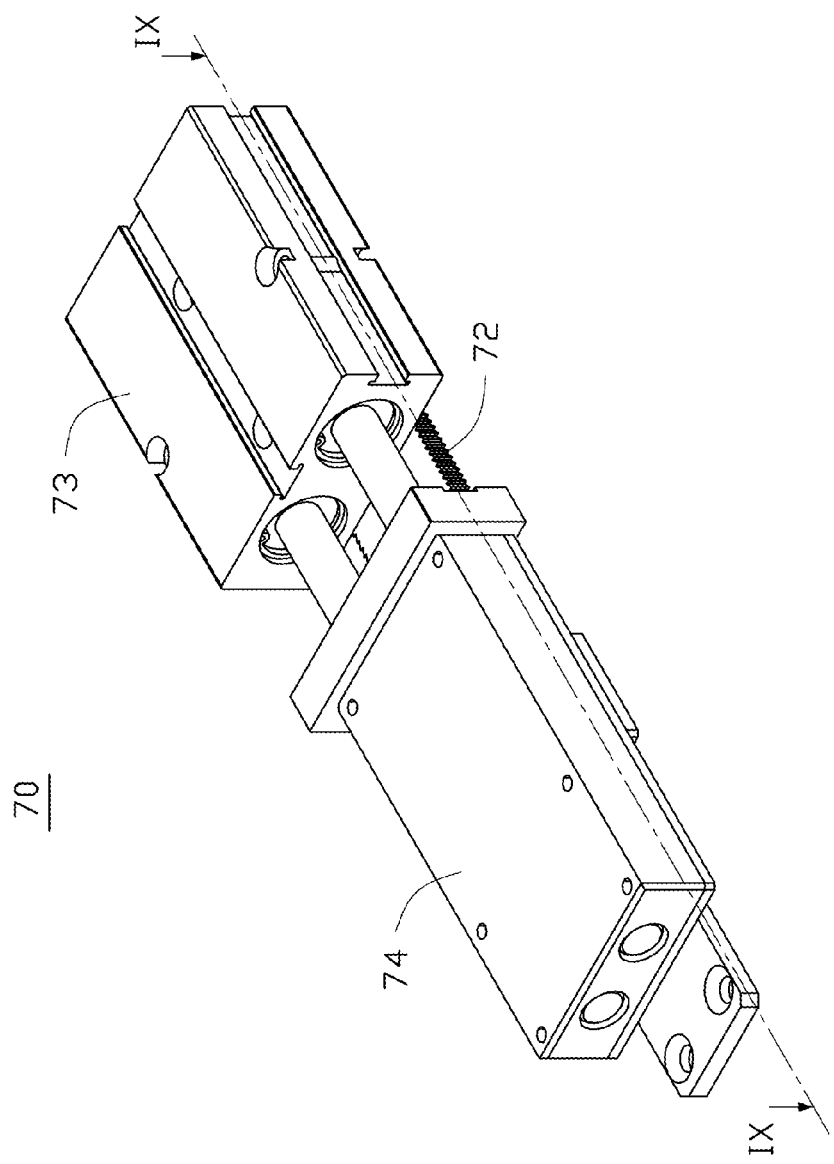
FIG. 8 is an isometric view of a braking mechanism of the processing device shown in FIG. 1.
Figure 9:
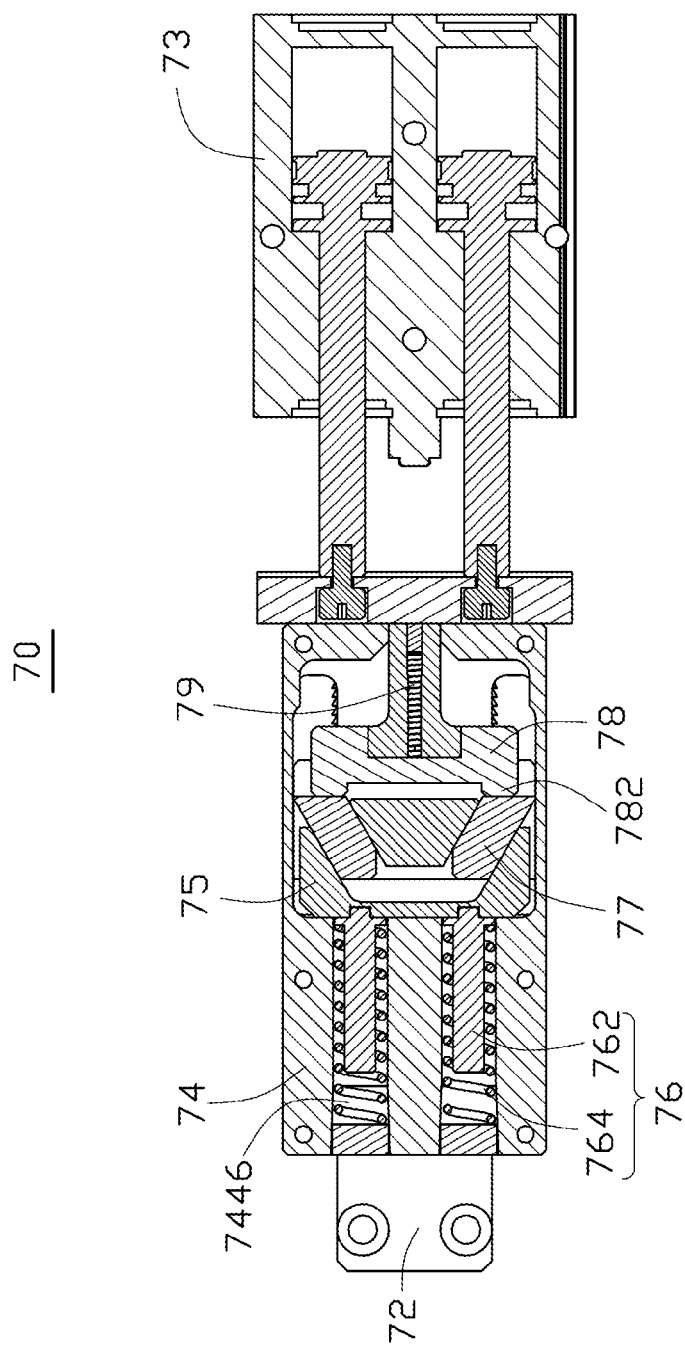
FIG. 9 is a cross sectional view taken along a line IX-IX of the braking mechanism shown in FIG. 8.

FIG. 2, FIG. 8 and FIG. 9 illustrate that the braking mechanism 70 can include a rack 72, a receiving member 74, a base seat 75, a resetting member 76, a braking member 77, and an elastic member 79. The rack 72 can be mounted on the mounting member 39, and the receiving member 74 can be mounted on the rack 72. The base seat 75 can be slidably mounted on the receiving member 74, and two ends of the resetting member 76 can abut the base seat 75 and the receiving member 74. The braking member 77 can be slidably mounted on the receiving member 74, and configured to mesh with the rack 72 to stop the moving of the mounting member 39 and the rotor 33 when the processing device 100 loses power suddenly. The elastic member 79 can be positioned between the base seat 75 and the braking member 77, and the elastic member 79 and the resetting member 76 can be positioned at two opposite sides of the braking member 77.

Figure 10:
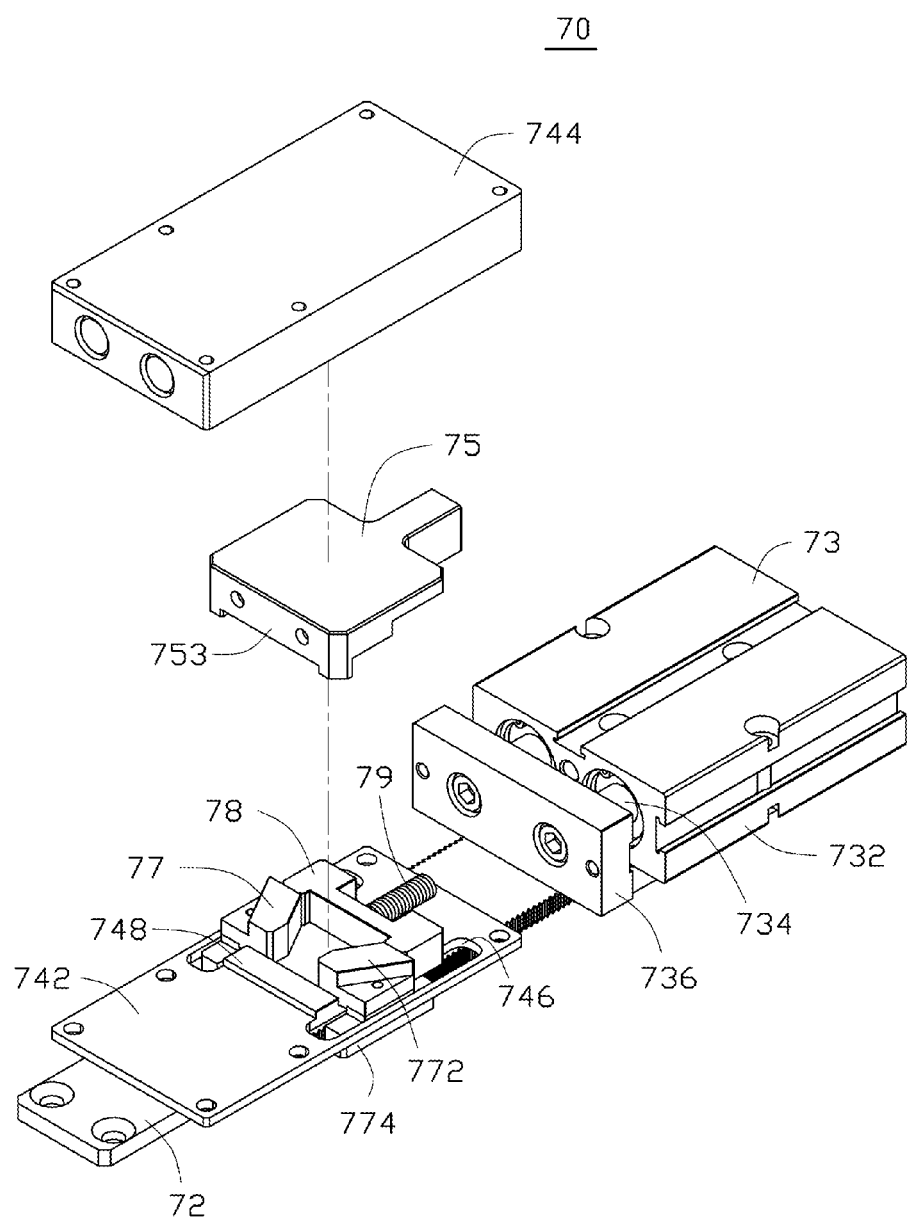
FIG. 10 is a partial, exploded view of the braking mechanism shown in FIG. 8.

The rack 72 can be mounted on the mounting member 39 and extend along the moving direction of the rotor 33. Two sides of the rack 72 can include engaging teeth. The braking mechanism 70 can further include a driving member 73 configured to drive the base seat 75 move relative to the receiving member 74. The driving member 73 can be mounted at one side of the receiving member and adjacent to the elastic member 79. FIG. 10 illustrates that the driving member 73 can include a driving main body 732, a drive shaft 734 and a pushing block 736. The drive shaft 734 can be movably mounted at one side of the driving main body 732 toward the receiving member 74, and the pushing block 736 can be mounted at one end portion of the drive shaft 734 away from the driving main body 732. In at least one embodiment, the driving member 73 can be a cylinder.

Figure 11:
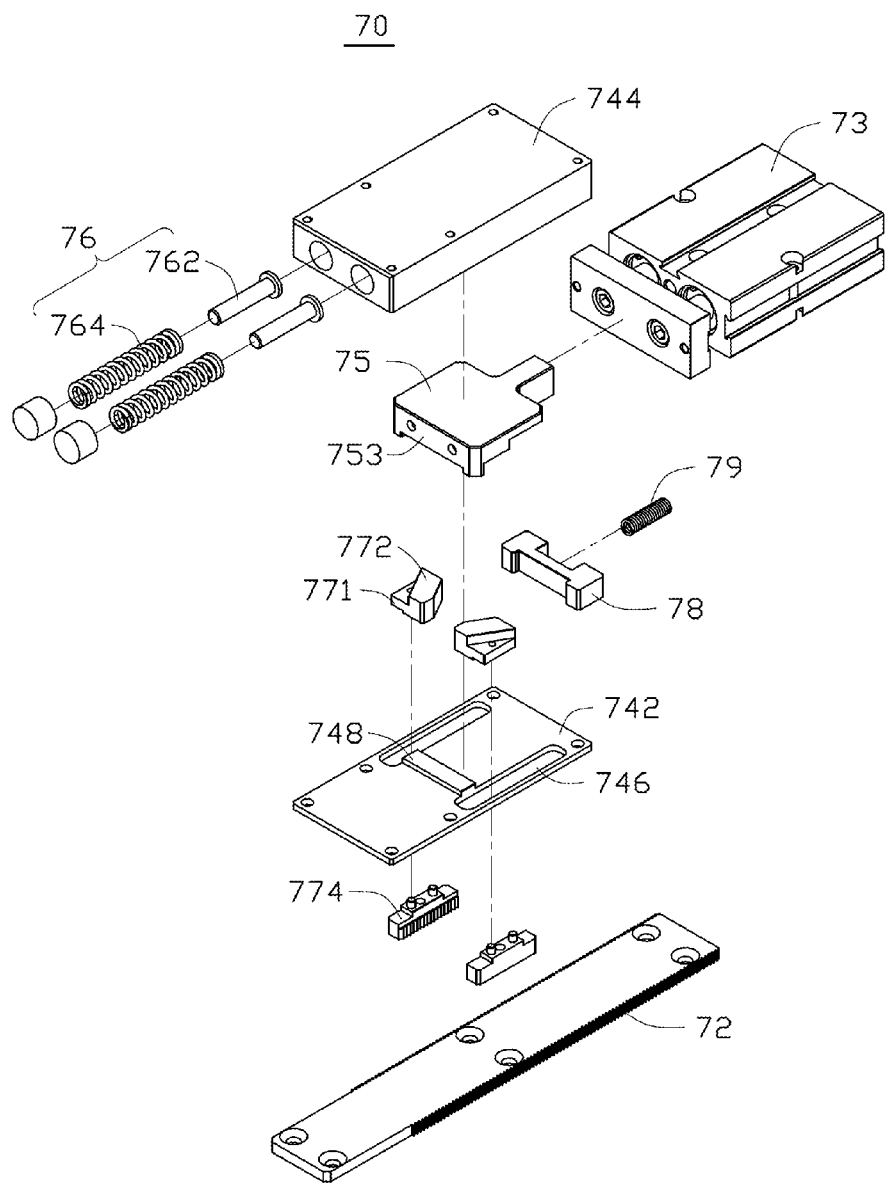
FIG. 11 is an exploded view of the braking mechanism shown in FIG. 8.
Figure 12:
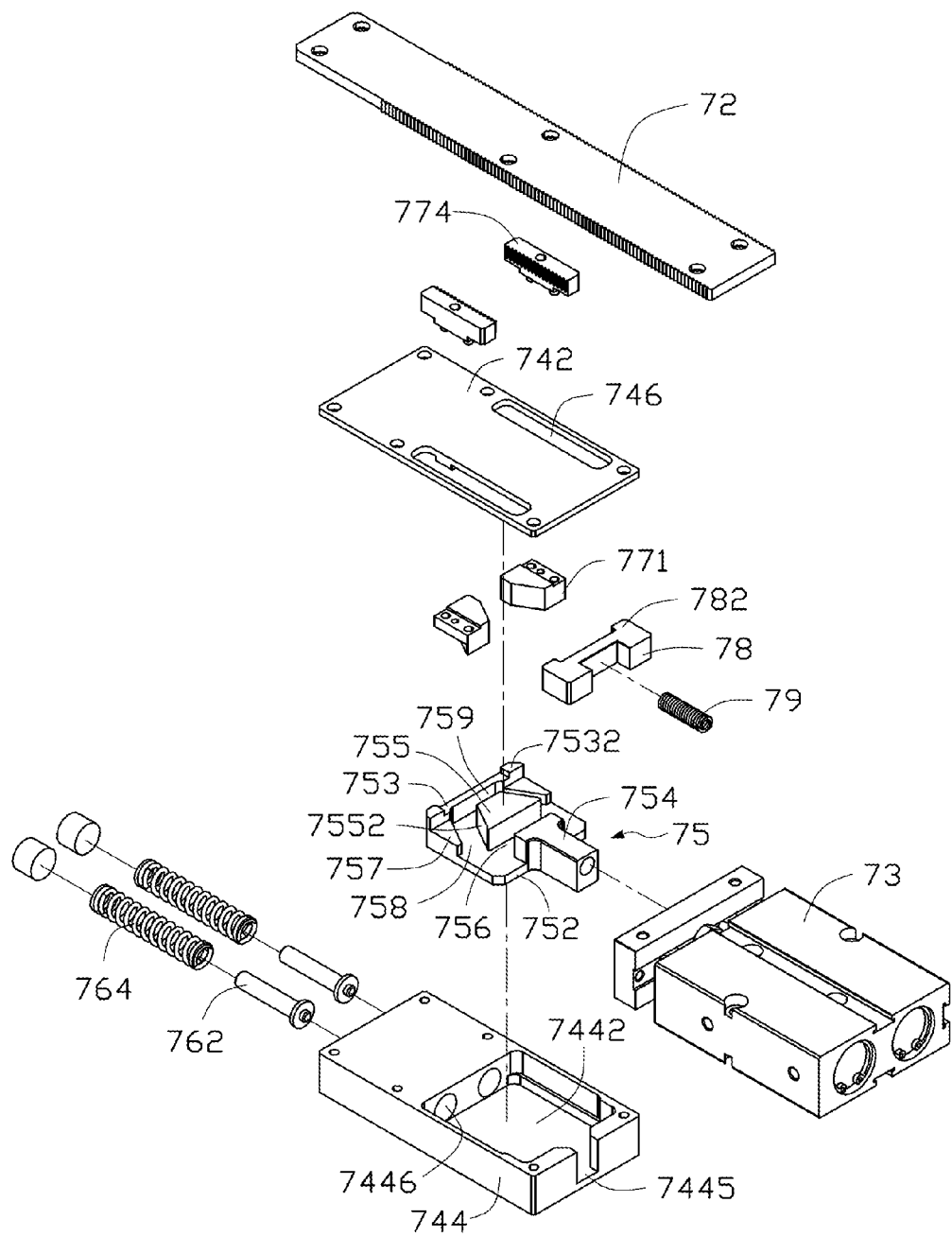
FIG. 12 is an exploded view of the braking mechanism shown in FIG. 11 from the other angle.

FIG. 10 and FIG. 11 illustrate that the receiving member 74 can be rectangular and include a base 742 and an upper casing 744 covered on the base 742. The base 742 can be mounted on the rack 72 and distanced from the driving member 73. The base 742 can define two sliding grooves 746 adjacent to the driving members 73, and the two sliding grooves 746 can be defined at two sides of the rack 72. The base 742 can include a stopper portion 748 protruding out of a surface away from the rack 72, and the stopper portion 748 can be positioned between the resetting member 76 and the braking member 77. The stopper portion 748 can be configured to restrict the movement of the braking member 77. FIG. 12 illustrates that the upper casing 744 can define a receiving portion 7442 adjacent to the driving member 73, and the receiving portion 7442 can be used to receive the base seat 75. The receiving portion 7442 can define an inserting hole 7445 through a sidewall adjacent to the driving member 73, and the inserting hole 7445 can be in communication with the receiving portion 7442. The receiving portion 7442 can further define two receiving holes 7446 through a sidewall away from the driving member 73. The two receiving holes 7446 can extend along the moving direction of the rotor 33 and arranged spaced from each other.

Figure 13:
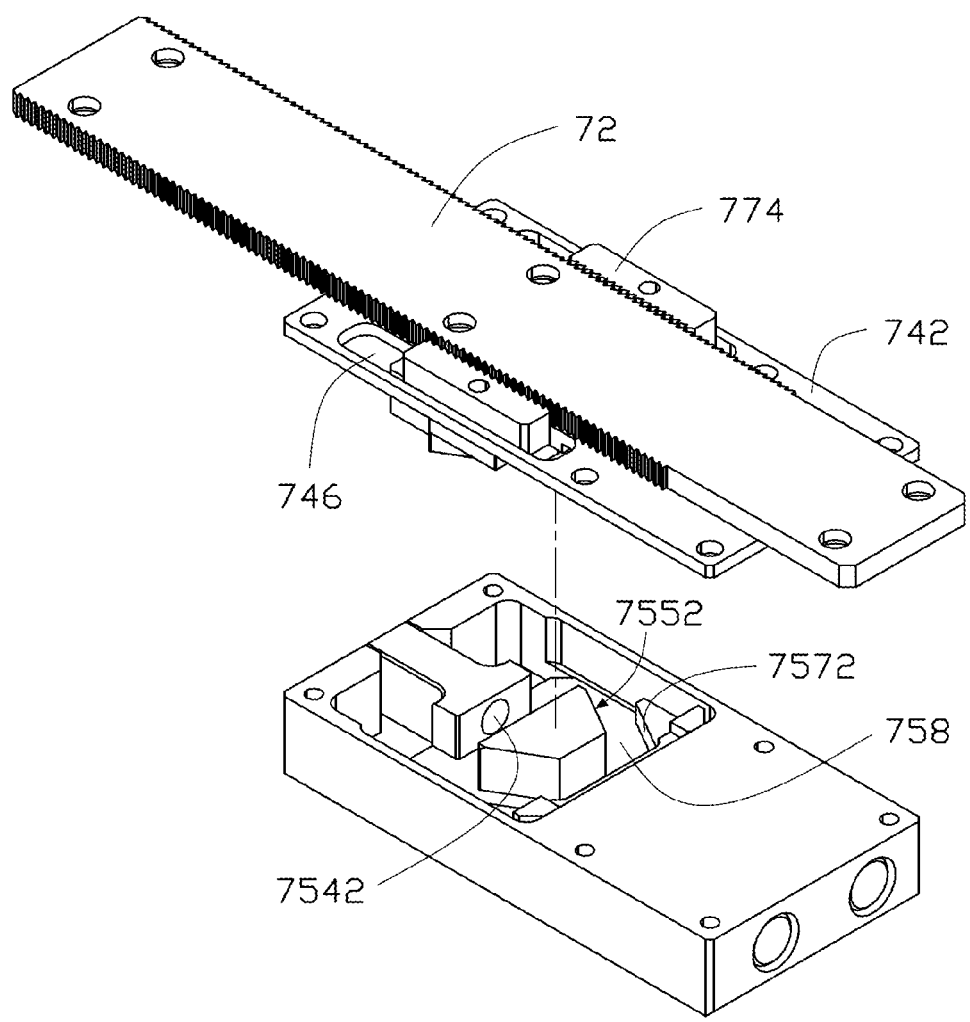
FIG. 13 is a partial, exploded view of the braking mechanism omitting a driving member shown in FIG. 10.

FIG. 12 and FIG. 13 illustrate that the base seat 75 can include a base plate 752, a side plate 753, an extending part 754, a protrusion part 755, and a mating part 757. The side plate 753 can protrude out of one end portion of the base seat 75 away from the driving member 73. The side plate 753 can include two protrusions 7532 spacing from each other. The extending part 754 can be substantially T-shaped can protrud out of one end portion of the base seat 75 away from the side plate 753, and one end of the extending part 754 can pass through the inserting hole 7445 of the upper casing 744. The extending part 754 can define an extending part through hole 7542 along the moving direction of the rotor 33. The protrusion part 755 can be substantially trapezoid and can protrud out of a middle portion of the base plate 752. The protrusion part 755 can include two inclined surfaces 7552, and a distance between the two inclined surfaces 7552 can be decreased along a direction away from the driving member 73. The protrusion part 755 and the extending part 754 can cooperatively form a sliding portion 756. The mating part 757 can include two inclined sidewalls 7572 facing the two inclined surfaces 7552. The inclined sidewall 7572 and the inclined surface 7552 can be parallel, and cooperatively form a first guiding portion 758 therebetween. The first guiding portion 758 can be communicated with the sliding portion 756. The side plate 753 and the protrusion part 755 can cooperatively form a connecting groove 759 therebetween, and the connecting groove 759 can be communicated with the first guiding portion 758.

FIG. 9 and FIG. 11 illustrates that the resetting members 76 are two, and each resetting member 76 can be received in one receiving hole 7446. The resetting member 76 can include a stiffener 762 and a resetting part 764. One end of the stiffener 762 can be fixed at the side plate 753. In at least one embodiment, the resetting part 764 can be a spring. The resetting part 764 can be longer than the stiffener 762. The resetting part 764 can be sleeved on the stiffener 762, and two ends of the resetting part 764 can abut the side plate 753 and the end surface of the receiving hole 7446 away from the driving member 73.

The braking member 77 can include a sliding main body 771, a second guiding portion 772 mounted on the sliding main body 771, and an engaging part 774. The second guiding portion 772 can be protruded from a surface of the sliding main body 771 toward the base seat 75, and can be accommodated with the first guiding portion 758. The second guiding portion 772 can be slidably received in the first guiding portion 758. The engaging part 774 can be fixed at the sliding main body 771, and can slidably pass through the sliding groove 746. A surface of the engaging part 774 toward the rack 72 can include engaging teeth mated with the rack 72. When the second guiding portion 772 move away from the driving member 73 along the first guiding portion 758, the engaging part 774 can move toward the rack 72 in the sliding groove 746, thus the engaging part 774 can mesh with the rack 72 to stop the moving of the mounting member 39 and the rotor 33. When the second guiding portion 772 move toward the driving member 73 along the first guiding portion 758, the engaging part 774 can move away from the rack 72 in the sliding groove 746, thus the engaging part 774 no longer mesh with the rack 72, and the mounting member 39 and the rotor 33 can move smoothly.

FIG. 9, FIG. 10, and FIG. 12 illustrate that the elastic member 79 can be received in the extending part through hole 7542 and positioned between the base seat 75 and the braking member 77. The braking mechanism 70 can further include a resisting member 78 slidably mounted on the sliding portion 756 and positioned between the elastic member 79 and the braking member 77. The two ends of the elastic member 79 can abut the resisting member 79 and the base seat 75. The resisting member 78 can include two resisting portions 782 protruding form one end thereof toward the side plate 753. The resisting portions 782 can abut the second guiding portion 772 of the braking member 77 and the sliding main body 771.

In assembly, the two stators 31 can be mounted in the fixing base 10, and the two sliding rails 35 can be mounted on the corresponding stators 31. The stator 33 can be movably disposed between the two stators 31, and the two sliding members 37 with the mounting member 39 can be slidably arranged on the corresponding sliding rails 35. The fixing member 51 with the liquid inlet joint 55 can be mounted on the mounting member 39, and the connecting member 52 can be mounted on the fixing base 10. One end of the transmission member 53 can movably pass through the connecting member 52 and extend outside of the fixing base 10, and the other end of the transmission member 53 can be fixed on the fixing member 51. The assembling member 54 can be mounted on the transmission member 53, and the processing member 58 can be mounted on the fixing member 51. The first liquid outlet joint 56 and the second liquid outlet joint 57 can be mounted on the assembling member 54, and the openings 5631 of the first liquid outlet joint 56 and the second liquid outlet joint 57 can be arranged toward the two sides of the processing member 58. The holding member 51 with the chip breaker 502 can be mounted on the assembling member 54.

In assembling the braking mechanism 70, the base seat 75 can be slidably received in the receiving portion 7442, and the resetting member 76 can be received in the receiving hole 7446. The elastic member 79 can be received in the extending portion through hole 7542, and the resisting member 78 can be slidably mounted in the sliding portion 756, thus the second guiding portion 772 of the braking member 77 can be slidably received in the first guiding portion 758. Then, the base 742 can be fixed at the upper casing 744, and the engaging part 774 can be slidably pass through the sliding groove 746. The base 742 and the driving member 73 can be arranged on the rack 72 and spaced from each other. The rack 72 can be fixed at the mounting member 39 and extend along the moving direction of the rotor 33.

In use, the pipeline 59 can be connected with an external coolant liquid, and the two stators 31 can be connected to an external power, and the rotor 33 can slide along the sliding path 313. The mounting member 39 can move with the rotor 33, and the two sliding members 37 can slide on the sliding rails 35. At the same time, the drive shafts 734 can extend out of the receiving member 74 to push the base seat 75, and the base seat 75 can move toward the resetting member 76 relative to the receiving member 74. Then the resetting member 76 can be compressed. When the base sat 75 moves to a certain position relative to the receiving member 74, the stopper portion 748 can slide into the connecting groove 759 and abut the braking member 77, thus the braking member 77 can stop moving with the base seat 75. The base seat 75 can move toward the resetting member 76 driven by the driving member 73, then the braking member 77 can move away from the resetting member 76 along the guiding part 75, thus the engaging part 774 can move away from the rack 72, and the mounting member 39 and the rotor 33 can move smoothly. The braking member 77 can compress the elastic member 79 when moving away from the resetting member 73 along the first guiding portion 758. The processing member 58 can process the workpiece driven by the mounting member 39. The coolant liquid can flow into the liquid inlet joint 55 continually, and flow into the first liquid outlet joint 56 and the second liquid outlet joint 57 through the through hole 531, and can be spurted to the two sides of the workpiece for cooling the workpiece. The coolant liquid can be cutting fluid, cold water, or coolant draught.

When the processing device 100 loses power, the driving member 73 can stop working. An elastic restorative force of the resetting member 76 can make the base seat 75 move toward the driving member 73, and the elastic restoring force of the elastic member 79 can make the braking member 77 move toward the resetting member 76 at the same time. The engaging part 774 of the braking member 77 can move toward the rack 72 and mesh with the rack 72, and the mounting member 39 and the rotor 33 can stop moving. As the braking member 77 and rack 72 are engaged, the resetting member 76 can make the braking member 77 move with the base seat 75 toward the driving member 73, and the mounting member 39 and the rotor 33 can move away from the workpiece.

When the processing device 100 loses power, the resetting member 76 and the elastic member 79 can provide the elastic restorative force, and the braking member 77 can mesh with the rack 72, thereby the sliding module 30 and the processing module 50 can stop moving, and the workpiece would not be scratched by the processing module 50. Furthermore, as a distance between the engaging part 774 and the rack 72 is small, the engaging part 774 can mesh with the rack 72 immediately when the processing device loses power. As the assembling member 54 can define the channel 5411, the coolant liquid can flow through the channel 5411, the first liquid outlet joint 56, and the second liquid outlet joint 57 and be spurted to the two sides of the workpiece for cooling the workpiece.

In other embodiments, the first liquid outlet joint 56 and the second liquid outlet joint 57 can be omitted, and the two protrusion portions 563 can be arranged on the fixing portion 543.

In other embodiments, the support member 60 can be omitted, and the pipeline 59 can be inserted to the fixing base 10 through a hole (not shown) defined on the second fixing plate 12 adjacent the liquid inlet joint 55.

In at least one embodiment, the stator 31 and the rotor 33 can form a pushing member. In other embodiments, and the pushing member can be a cylinder, a rotor, or other pushing parts.

In other embodiments, the connecting surface 5431, the assembling surface 5432, the first fixing surface 5433, and the second fixing surface 5434 can be omitted, as long as the openings 5631 of first liquid outlet joint 56 and the second liquid outlet joint 57 can be arranged toward the workpiece.

In other embodiments, the two sliding rails 35 and the two sliding member 37 can be omitted. Each of the two stators 31 can include a sliding rail, and the mounting member 39 can define a groove, and the groove of the mounting member 39 can be slidably sleeved on the sliding rail of the stators 31. In other embodiments, the two stators 31 can define grooves, and the mounting member 39 can have a protrusion, slidably arranged in the grooves of the two stators 31.

In other embodiments, the extending part 754 can be omitted, and the driving member 73 can drive the base seat 75 to compress the resetting member 76.

In other embodiments, the upper casing 744 can be omitted, and the base seat 75 can be slidably mounted on the braking member 77. The base 742 can have a bend portion on a surface away from the rack 72, and one end of the resetting member 76 away from the base 75 can resist the bend portion.

In other embodiments, the resisting member 78 can be omitted, and the two ends of the elastic member 79 can abut the base seat 75 and the braking member 77.

In other embodiments, the driving member 73 can be omitted, as long as the resetting member 76 is compressed during processing the workpiece.

In other embodiments, the engaging part 774 can be integrated with the sliding main body 771.

In other embodiments, the stiffener 762 can be omitted, and the resetting part 764 can be used to reset the base 75.

In other embodiments, the pushing block 736 can be omitted, and the drive shaft 734 can directly drive the base 75.

In other embodiments, the number of the receiving hole 7446 and the resetting member 76 can be one or more. The through hole 7542 can be omitted, and the resetting member 76 can be arranged at the base 75 and the sidewall of the receiving portion 7442 away from the driving member 73.

In other embodiments, the first guiding portion 758 can be displaced with a guiding rail, and the second guiding portion 772 can be displaced with a sliding groove.

The embodiments shown and described above are only examples. Many details are often found in the art such as the other features of a braking mechanism and a processing device using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A braking mechanism comprising:
   a rack;
   a receiving member mounted on the rack;

a braking member movably mounted on the receiving member;
a base seat slidably mounted on the receiving member;
a resetting member, two ends of the resetting member abutting the base seat and the receiving member; and
an elastic member positioned between the base seat and the braking member;
wherein the elastic member and the resetting member are positioned at opposite sides of the braking member;
wherein the base seat comprises a first guiding portion, the braking member comprises a second guiding portion and an engaging part mounted on the first guiding portion, and the second guiding portion is slidably engaged with the first guiding portion; and
wherein the second guiding portion is capable of moving along the first guiding portion under an elastic restorative force imposed by the resetting member and the elastic member, such that the engaging part is engaged with the rack.

2. The braking mechanism as claimed in claim 1, wherein the mechanism further comprises a resisting member, the resisting member is slidably mounted on the base seat and positioned between the elastic member and the braking member, and two ends of the elastic member abut the resisting member and the base seat.

3. The braking mechanism as claimed in claim 2,
wherein the base seat comprises an extending portion protruded out of one end portion of the base plate away from the side plate, and the base seat comprises a sliding portion communicated with the first guiding portion; and
wherein the resisting member is mounted in the sliding portion in a sliding way, and the elastic member is received in the extending portion.

4. The braking mechanism as claimed in claim 3, wherein the braking mechanism further comprises a driving member mounted at one side of the receiving member and adjacent to the elastic member, and the extending portion is capable of protruding out of the receiving member to abut the driving member.

5. The braking mechanism as claimed in claim 2, wherein the resisting member comprises a resisting portion, the resisting portion is protruded from one end of the resisting member toward the braking member and abuts the second guiding portion.

6. The braking mechanism as claimed in claim 1,
wherein the receiving member comprises a base and an upper casing covered on the base, the upper casing define a receiving portion, and the base plate is slidably received in the receiving portion;
wherein one end of the resetting member abuts the upper casing, and the base is fixed on the rack; and
wherein the base defines a sliding groove through thereof, the engaging part passes through the sliding groove in a sliding way, and the engaging part is positioned spaced from the rack.

7. The braking mechanism as claimed in claim 1, wherein the base comprises a stopper portion, and the stopper portion is positioned between the resetting member and the braking member to restrict the movement of the braking member.

8. The braking mechanism as claimed in claim 1,
wherein the number of the first guiding portion and the braking member are two, and a distance between the two first guiding portions is decreased along a direction away from the elastic member; and
wherein each second guiding portion of the braking member is received in one of the first guiding portions.

9. The braking mechanism as claimed in claim 1,
wherein the resetting member comprises a stiffener and a resetting part, one end of the stiffener is fixed at the base plate, and the resetting part is longer than the stiffener; and
wherein the resetting part is sleeved on the stiffener, and two ends of the resetting part abut the base plate and the receiving member.

10. A processing device comprising:
a fixing base;
a sliding module mounted on the fixing base;
a processing module mounted on the fixing base and being capable of moving with the sliding module; and
a braking mechanism mounted in the receiving base, the braking mechanism comprising:
a rack mounted on the sliding module;
a receiving member mounted on the rack;
a braking member movably mounted on the receiving member;
a base seat mounted on the receiving member or the braking member;
a resetting member, two ends of the resetting member abutting the base seat and the receiving member; and
an elastic member positioned between the base seat and the braking member;
wherein the elastic member and the resetting member are positioned at opposite sides of the braking member;
wherein the base seat comprises a first guiding portion, the braking member comprises a second guiding portion and an engaging part mounted on the first guiding portion, and the second guiding portion is slidably engaged with the first guiding portion; and
wherein the second guiding portion is capable of moving along the first guiding portion under an elastic restorative force imposed by the resetting member and the elastic member, such that the engaging part is engaged with the rack to stop a moving of the sliding module and the processing module.

11. The processing device as claimed in claim 10,
wherein the sliding module comprises two stators, a rotor, two sliding rails, two sliding members, and a mounting member;
wherein each sliding rail is mounted at the corresponding stator, the sliding members are slidably mounted on the sliding rails, and the mounting member is mounted on the stator; and
wherein the processing module is coupled to the mounting member.

12. The processing device as claimed in claim 10,
wherein the processing module comprises a fixing member, a connecting member, a transmission member, an assembling member, a liquid inlet joint, a first liquid outlet joint, a second liquid outlet joint, and a processing member;
wherein the fixing member is mounted on the sliding module, the connecting member is mounted at the fixing base, the transmission member passes through the connecting member and extends outside of the fixing base; and
wherein the assembling member is mounted on the transmission member, and the processing member is mounted on the assembling member.

13. The processing device as claimed in claim 10, wherein the mechanism further comprises a resisting member, the resisting member is slidably mounted on the base seat and positioned between the elastic member and the braking member, and two ends of the elastic member abut the resisting member and the base seat.

14. The processing device as claimed in claim 13,
wherein the base seat comprises an extending portion protruded out of one end portion of the base plate away from the side plate, and the base seat comprises a sliding portion communicated with the first guiding portion; and
wherein the resisting member is mounted in the sliding portion in a sliding way, and the elastic member is received in the extending portion.

15. The processing device as claimed in claim 14, wherein the braking mechanism further comprises a driving member mounted at one side of the receiving member and adjacent to the elastic member, and the extending portion is capable of protruding out of the receiving member to abut the driving member.

16. The processing device as claimed in claim 13, wherein the resisting member comprises a resisting portion, and the resisting portion is protruded from one end of the resisting member toward the braking member and abuts the second guiding portion.

17. The processing device as claimed in claim 10,
wherein the receiving member comprises a base and an upper casing covered on the base, the upper casing defines a receiving portion, and the base plate is slidably received in the receiving portion;
wherein one end of the resetting member abuts the upper casing, and the base is fixed on the rack; and
wherein the base define a sliding groove through thereof, the engaging part passes through the sliding groove in a sliding way, and the engaging part is positioned spaced from the rack.

18. The processing device as claimed in claim 10, wherein the base comprises a stopper portion, and the stopper portion is positioned between the resetting member and the braking member to restrict the movement of the braking member.

19. The processing device as claimed in claim 10,
wherein the number of the first guiding portion and the braking member are two, and a distance between the two first guiding portions is decreased along a direction away from the elastic member; and
wherein each second guiding portion of the braking member is received in one of the first guiding portions.

20. The processing device as claimed in claim 10,
wherein the resetting member comprises a stiffener and a resetting part, one end of the stiffener is fixed at the base plate, and the resetting part is longer than the stiffener; and
wherein the resetting part is sleeved on the stiffener, and two ends of the resetting part abut the base plate and the receiving member.

\* \* \* \* \*